(12) United States Patent
Kang et al.

(10) Patent No.: US 10,665,890 B2
(45) Date of Patent: May 26, 2020

(54) CONDUCTIVE MATERIAL FOR SECONDARY BATTERY, AND SECONDARY BATTERY CONTAINING SAME

(71) Applicant: LG CHEM, LTD., Seoul (KR)

(72) Inventors: Kyung Yeon Kang, Daejeon (KR); Jong Heon Seol, Daejeon (KR); Ji Hee Woo, Daejeon (KR); Ye Lin Kim, Daejeon (KR); Dong Hyun Cho, Daejeon (KR); Sang Hoon Choy, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/578,177

(22) PCT Filed: Sep. 9, 2016

(86) PCT No.: PCT/KR2016/010173
§ 371 (c)(1),
(2) Date: Nov. 29, 2017

(87) PCT Pub. No.: WO2017/043919
PCT Pub. Date: Mar. 16, 2017

(65) Prior Publication Data
US 2018/0175439 A1    Jun. 21, 2018

(30) Foreign Application Priority Data

Sep. 10, 2015 (KR) .................. 10-2015-0128378
Sep. 8, 2016 (KR) .................. 10-2016-0115896

(51) Int. Cl.
*H01M 10/052* (2010.01)
*H01M 4/13* (2010.01)
(Continued)

(52) U.S. Cl.
CPC ......... *H01M 10/052* (2013.01); *C01B 32/158* (2017.08); *C01B 32/162* (2017.08);
(Continued)

(58) Field of Classification Search
CPC .......... H01M 4/13; H01M 4/583; H01M 4/62; H01M 10/052; C01B 32/158;
(Continued)

(56) References Cited

U.S. PATENT DOCUMENTS 6,596,438 B2    7/2003 Zeng
7,214,430 B2    5/2007 Handa et al.
(Continued)

FOREIGN PATENT DOCUMENTS

CN    1578811 A    2/2005
CN    1698226 A    11/2005
(Continued)

OTHER PUBLICATIONS

Siang-Piao Chai et al., "The effect of catalyst calcination temperature on the diameter of carbon nanotubes synthesized by the decomposition of methane", ScienceDirect, Carbon, 2007, vol. 45, pp. 1535-1541.
(Continued)

*Primary Examiner* — Rena Dye Cronin
(74) *Attorney, Agent, or Firm* — Dentons US LLP

(57) ABSTRACT

The present invention provides a conductive material for a secondary battery, and a secondary battery containing the same, the conductive material comprising carbon nanotubes, having a secondary structure in which carbon nanotube units having a diameter of 20-150 nm are entangled, having a ratio of true density to bulk density (TD/BD) of 30-120, having a metal content of 50 ppm or less, and having both excellent dispersibility and high purity, thereby being capable of improving, by increasing the conductivity within an elec-
(Continued)

trode, battery performance, particularly, battery performance at room temperature and low temperature when applied to a battery.

14 Claims, 4 Drawing Sheets

(51) Int. Cl.
　　*H01M 4/62*　　　(2006.01)
　　*H01M 4/583*　　 (2010.01)
　　*C01B 32/17*　　 (2017.01)
　　*C01B 32/162*　　(2017.01)
　　*C01B 32/158*　　(2017.01)
　　*H01M 2/10*　　　(2006.01)

(52) U.S. Cl.
　　CPC .............. *C01B 32/17* (2017.08); *H01M 2/10* (2013.01); *H01M 4/13* (2013.01); *H01M 4/583* (2013.01); *H01M 4/62* (2013.01); *H01M 4/621* (2013.01); *C01B 2202/22* (2013.01); *C01B 2202/30* (2013.01); *C01B 2202/32* (2013.01); *C01B 2202/36* (2013.01); *C01B 2204/32* (2013.01); *C01P 2006/10* (2013.01); *C01P 2006/40* (2013.01)

(58) Field of Classification Search
　　CPC ............ C01B 2204/32; C01B 2202/22; C01B 2202/32; C01B 2202/36; C01P 2006/10; C01P 2006/40
　　See application file for complete search history.

(56) References Cited

U.S. PATENT DOCUMENTS

| | | | |
|---|---|---|---|
| 7,575,800 | B2 | 8/2009 | Endo et al. |
| 8,398,949 | B2 * | 3/2013 | Meyer ................... A61K 33/44 423/447.1 |
| 9,005,564 | B2 | 4/2015 | Kang et al. |
| 9,399,578 | B2 | 7/2016 | Kang et al. |
| 9,434,617 | B2 | 9/2016 | Kang et al. |
| 9,731,277 | B2 | 8/2017 | Chan et al. |
| 10,226,756 | B2 | 3/2019 | Chan et al. |
| 2003/0008211 | A1 | 1/2003 | Zeng |
| 2004/0150312 | A1 | 8/2004 | McElrath et al. |
| 2005/0078561 | A1 | 4/2005 | Endo et al. |
| 2006/0099487 | A1 * | 5/2006 | Fukuda ................... H01M 4/92 429/483 |
| 2006/0216516 | A1 | 9/2006 | Handa et al. |
| 2006/0216517 | A1 | 9/2006 | Handa et al. |
| 2009/0286064 | A1 | 11/2009 | Endo et al. |
| 2010/0255402 | A1 * | 10/2010 | Heo ....................... B01J 21/185 429/483 |
| 2011/0086976 | A1 | 4/2011 | Endo et al. |
| 2014/0054513 | A1 | 2/2014 | Chan et al. |
| 2014/0106257 | A1 * | 4/2014 | Raychaudhuri ....... C01B 32/174 429/521 |
| 2014/0255698 | A1 | 9/2014 | Kang et al. |
| 2014/0328744 | A1 * | 11/2014 | Kang ..................... B01J 23/881 423/447.3 |
| 2015/0151970 | A1 | 6/2015 | Kang et al. |
| 2015/0238950 | A1 | 8/2015 | Kim et al. |
| 2015/0273441 | A1 | 10/2015 | Kim et al. |
| 2015/0274529 | A1 | 10/2015 | Kim et al. |
| 2015/0298974 | A1 | 10/2015 | Kim et al. |
| 2016/0020466 | A1 * | 1/2016 | Ulbrich ............... H01M 4/0404 429/217 |
| 2017/0282158 | A1 | 10/2017 | Chan et al. |

FOREIGN PATENT DOCUMENTS

| | | | |
|---|---|---|---|
| CN | 1922256 | A | 2/2007 |
| CN | 103429342 | A | 12/2013 |
| CN | 103987659 | A | 8/2014 |
| CN | 104401963 | A | 3/2015 |
| EP | 2803638 | A1 | 11/2014 |
| JP | 2005-75661 | A | 3/2005 |
| JP | 2006-306636 | A | 11/2006 |
| JP | 2015-118749 | A | 6/2015 |
| KR | 20030013553 | A | 2/2003 |
| KR | 10-2013-0082460 | A | 7/2013 |
| KR | 10-2015-0007267 | A | 1/2015 |
| KR | 10-2015-0037601 | A | 4/2015 |
| WO | 2013/105779 | A1 | 7/2013 |
| WO | WO-2013105784 | A1 * | 7/2013 ............ B01J 23/881 |
| WO | WO-2014128190 | A1 * | 8/2014 .......... H01M 4/0404 |
| WO | 2015/008988 | A1 | 1/2015 |
| WO | 2015-047042 | A1 | 4/2015 |

OTHER PUBLICATIONS

A.K.M. Fazle Kibria et al., "Synthesis of carbon nanotubes over nickel-iron catalysts supported on alumina under controlled conditions", Catalysis Letters, 2001, vol. 71, No. 3-4, pp. 229-236.
XP000951419, Willems I et al., Control of the Outer Diameter of Thin Carbon Nanotubes Synthesized by Catalytic Decomposition of Hydrocarbon, Chemical Physics Letters, Elsevier BV, vol. 317, No. 1/02, Jan. 28, 2000, pp. 71-76.
XP055489152, Elaine Lay Khim Chng et al., Purification of carbon nanotubes by high temperature chlorine gas treatment, Physical Chemistry Chemical Physics., vol. 15, No. 15, Jan. 1, 2013, p. 5615.
XP002782693, Database WPI, Week 200340, Thomson Scientific, AN 2003-427787.
XP055489156, Iwona Pelech et al., Simultaneous purification and functionalization of carbon nanotubes using chlorination, Journal of Materials Research, vol. 27, No. 18, Jul. 31, 2012, pp. 2368-2374.
XP055489157, Iwona Pelech et al., Chlorination of Carbon Nanotubes Obtained on the Different Metal Catalysts, Journal of Nanomaterials, vol. 2013, Jan. 1, 2013, pp. 1-9.
XP55040807, Mark H. Rummeli et al., Investigating the Outskirts of Fe and Co Catalyst Particles in Alumina-Supported Catalytic CVD Carbon Nanotube Growth, ACS NANO, vol. 4, No. 2, Feb. 23, 2010, pp. 1146-1152.
Wang Chongle, "Research on the Enhancement Mechanism and Properties of Carbon Nanotube Sponge Reinforced Polymer Matrix Composites", Harbin Institute of Technology, Mar. 15, 2014.

* cited by examiner

CONDUCTIVE MATERIAL FOR SECONDARY BATTERY, AND SECONDARY BATTERY CONTAINING SAME

CROSS-REFERENCE TO RELATED APPLICATION

This application is a National Stage Application of International Application No. PCT/KR2016/010173 filed on Sep. 9, 2016, which claims the benefit of Korean Patent Application No. 10-2015-0128378 filed on Sep. 10, 2015 and Korean Patent Application No. 10-2016-0115896 filed on Sep. 8, 2016, all of which are hereby incorporated by reference in their entirety for all purposes as if fully set forth herein.

TECHNICAL FIELD

The present invention relates to a conductive material for a secondary battery having excellent dispersibility and a secondary battery including the same.

BACKGROUND ART

As technology development and demand for mobile devices increase, demand for secondary batteries as an energy source is rapidly increasing. Among such secondary batteries, a lithium secondary battery which exhibits high energy density and voltage, a long cycle lifespan, and a low self-discharge rate has been commercialized and widely used. Also, research is being actively conducted on a method of manufacturing an electrode having higher energy density per unit volume by improving electrode density, such as an electrode for a high-capacity lithium secondary battery.

Generally, since a high-density electrode is formed by molding electrode active material particles having a size of several to several tens of μm through a high-pressure press, it is easy to deform particles, reduce a space between particles, and degrade permeability of an electrolyte solution.

In order to solve these problems, a conductive material having excellent strength in addition to excellent electric conductivity has been used to manufacture an electrode. When a conductive material is used to manufacture an electrode, a conductive material is dispersed between compressed electrode active materials, and thus a micropore between active material particles is maintained so that an electrolyte solution may be easily permeated, and conductivity is also excellent so that resistance in an electrode may be reduced. Among such conductive materials, carbon nanotubes as a fibrous carbon-based conductive material capable of further decreasing electrode resistance by forming an electroconductive pathway in an electrode have been increasingly used in recent years.

Carbon nanotubes, which are a type of carbon microfiber, are a form of tubular carbon having a diameter of 1 μm or less, and are expected to be applied to and practically used in various fields due to high conductivity, tensile strength, heat resistance and the like, which result from a specific structure thereof. However, despite their usefulness, carbon nanotubes have limited applications due to low solubility and dispersibility. That is, carbon nanotubes are not stably dispersed in an aqueous solution due to strong van der Waals forces between each other, which causes an agglomeration phenomenon.

In order to solve these problems, there have been various attempts. Specifically, a method of dispersing carbon nanotubes in a dispersion medium through a mechanical dispersion process such as sonication or the like has been proposed. However, this method has a problem in which dispersibility is excellent during irradiation of ultrasonic waves, but carbon nanotubes start to be agglomerated when the irradiation of ultrasonic waves is terminated, and are agglomerated as a concentration of carbon nanotubes is higher. Also, a method of stably dispersing carbon nanotubes using various dispersants has been proposed, but this method also has a problem of handling due to an increase in viscosity when carbon microfiber is dispersed at high concentration in a dispersion medium.

Accordingly, a preparation of carbon nanotubes having excellent dispersibility as a conductive material for a secondary battery is necessary.

DISCLOSURE

Technical Problem

It is an aspect of the present invention to provide a conductive material for a secondary battery having excellent dispersibility.

It is another aspect of the present invention to provide an electrode for a secondary battery, a lithium secondary battery, a battery module and a battery pack, which include the conductive material.

Technical Solution

According to an embodiment of the present invention, there is provided a conductive material for a secondary battery including carbon nanotubes which have a spherical secondary structure in which carbon nanotube units having a diameter of 20 to 150 nm are entangled, exhibit a ratio (TD/BD) of a true density (TD) and a bulk density (BD) of 30 to 120, and contain a metal at a content of 50 ppm or less.

According to another embodiment of the present invention, there is provided a method of preparing the conductive material for a secondary battery, which includes preparing carbon nanotubes by bringing a supported catalyst in which a metal catalyst is supported in an α-alumina support in contact with a carbon source at equal to or greater than 650° C. and less than 800° C.; and removing metal impurities in the carbon nanotubes through chlorination.

According to still another embodiment of the present invention, there are provided an electrode for a lithium secondary battery including the conductive material and a lithium secondary battery.

According to yet another embodiment of the present invention, there are provided a battery module including the lithium secondary battery as a unit cell and a battery pack including the same.

Other details about the embodiments of the present invention are included in the detailed description below.

Advantageous Effects

A conductive material for a secondary battery according to the present invention can exhibit excellent dispersibility in a composition upon a preparation of a composition for forming an electrode of a secondary battery because it includes large-diameter carbon nanotube units and simultaneously exhibits low density. Also, when the conductive material which exhibits high purity and increased conductivity in an electrode is applied to a battery, battery performance, particularly, battery performance at room temperature and low temperature can be improved. The conductive material and an electrode including the same as a conductive material are particularly beneficial to batteries requiring high capacity and long lifespans such as an automotive battery, a power tool battery and the like, particularly, batteries requiring minimum degradation of performance at room temperature and low temperature such as an automotive battery.

DESCRIPTION OF DRAWINGS

Because the following drawings attached to the present specification illustrate exemplary embodiments of the present invention and serve to facilitate understanding of the technical idea of the present invention together with the above-described content of the invention, the present invention should not be limitedly interpreted on the basis of the drawings.

MODES OF THE INVENTION

Figure 1A:
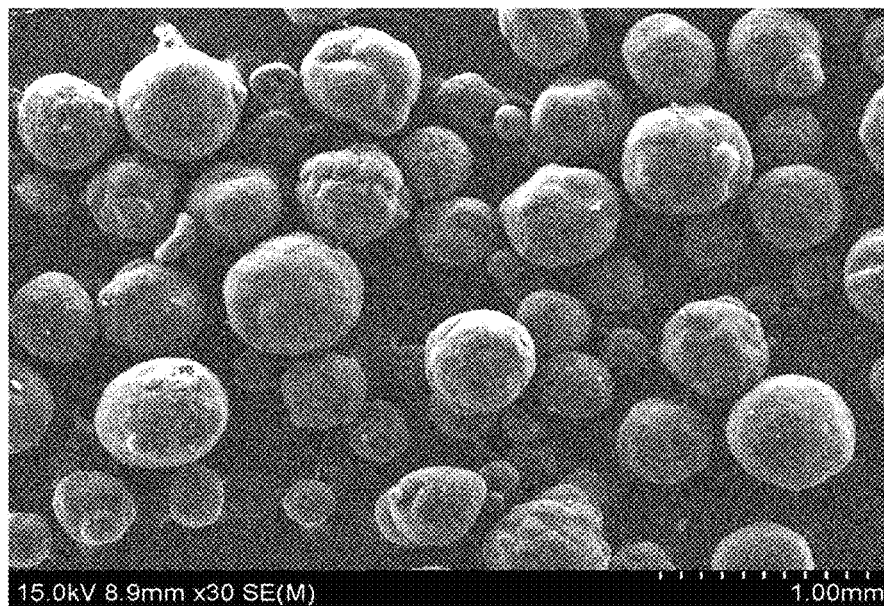
FIG. 1a is an image obtained by observing the conductive material according to Example 1-1 using a scanning electron microscope (SEM)
Figure 1B:
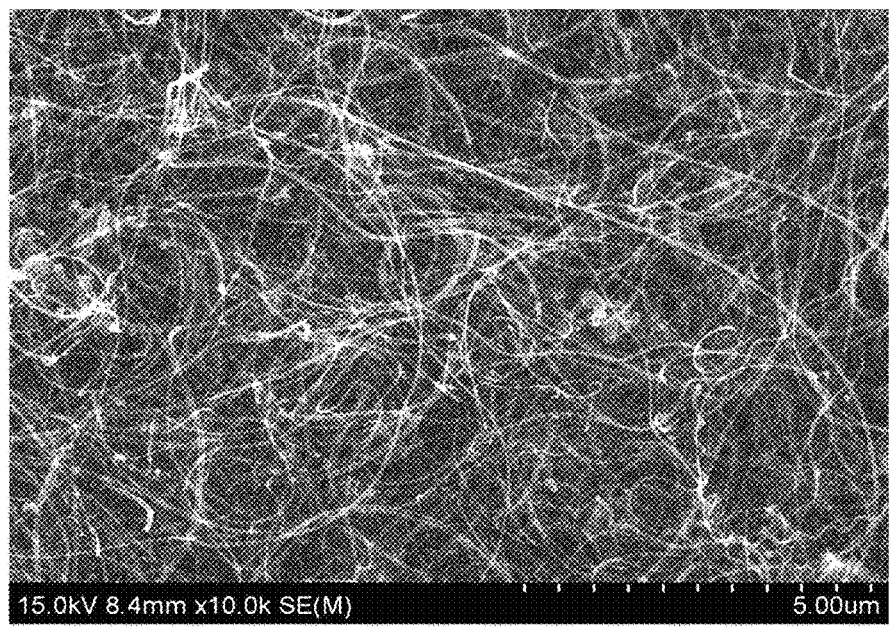
FIG. 1b is partially enlarged view thereof.
Figure 2A:
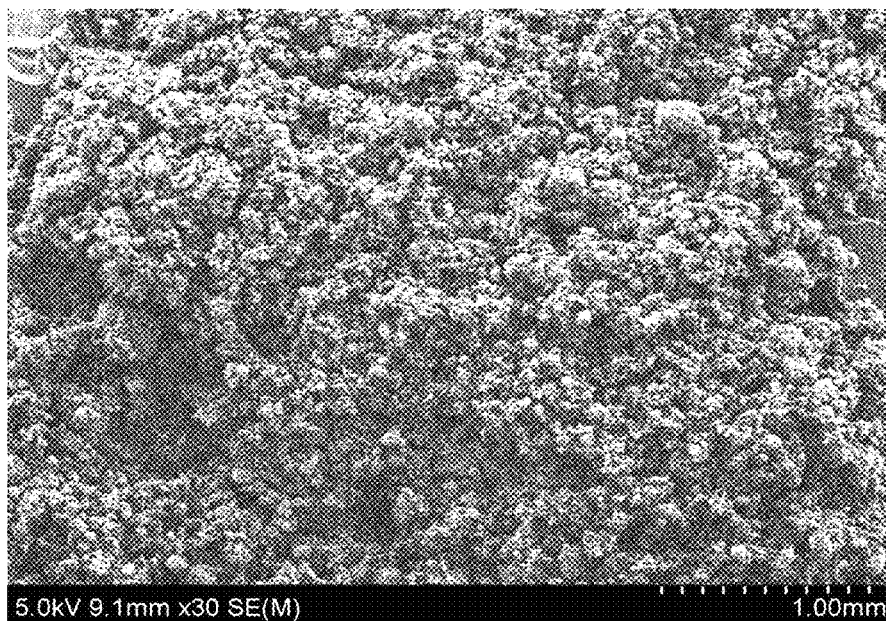
FIG. 2a is an image obtained by observing the conductive material according to Comparative Example 1-1 using a SEM.
Figure 2B:
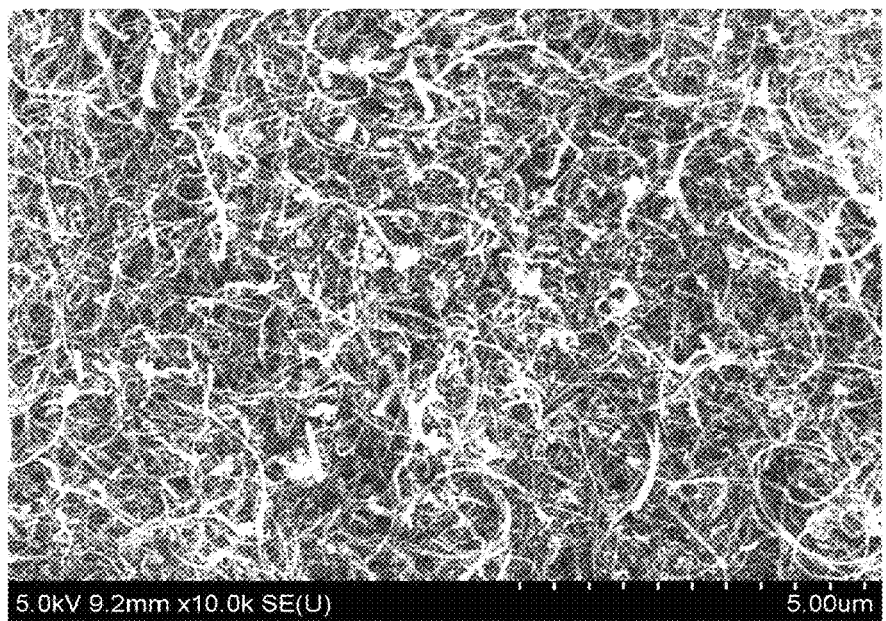
FIG. 2b is partially enlarged view thereof.

Hereinafter, the present invention will be described in more detail for promoting understanding of the present invention.

Terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

The term "bundle type" used herein, unless otherwise mentioned, refers to a bundle- or rope-type secondary shape in which a plurality of carbon nanotube (CNT) units are arranged in parallel or twisted in a spiral. The term "non-bundle type" or "entangled type" used herein refers to a shape in which a plurality of CNT units are entangled without limitation in specific orientation.

A conductive material according to an embodiment of the present invention includes carbon nanotubes (CNTs) which have a spherical secondary structure in which CNT units having a diameter of 20 to 150 nm are entangled, exhibit a ratio (TD/BD) of a true density (TD) and a bulk density (BD) of 30 to 120, and contain a metal at a content of 50 ppm or less.

As such, the conductive material for a secondary battery according to an embodiment of the present invention includes CNTs capable of exhibiting excellent dispersibility by including large-diameter CNT units and having low density, and thus, by increasing conductivity in an electrode, when the conductive material is applied to a battery, battery performance, particularly, battery performance at room temperature and low temperature may be improved.

Specifically, in the conductive material according to an embodiment of the present invention, CNTs have a spherical secondary structure in which CNT units are entangled. The term "spherical shape" used herein encompasses a substantially spherical shape in addition to a completely spherical shape, and may also encompass a case where a cross section has an elliptical shape such as a potato shape. Specifically, the CNTs with a spherical shape may have an average circularity of 0.9 to 1.0, which is measured using a flow particle image analyzer or is determined from the length ratio of a long axis and a short axis, which pass through the center of a particle in CNT particles observed through a SEM image.

In addition, graphite sheets of CNT units in the CNTs have a cylinder shape with nano-sized diameters and have a $sp^2$ bond structure. Depending on the angles and structures of the rolled-up graphite sheets, the CNTs may exhibit conductive or semiconductive characteristics. In addition, the CNTs may be classified into single-walled carbon nanotubes (SWCNTs), double-walled carbon nanotubes (DWCNTs) and multi-walled carbon nanotubes (MWCNTs) depending on the number of bonds forming walls. Such CNT units may exhibit specific characteristics due to a difference in structure, and particularly, SWCNT units may be suitable for use for realizing elaborate and integrated devices because they may exhibit metallic characteristics and semiconductive characteristics. In the conductive material according to an embodiment of the present invention, the CNTs may include any one or two or more of SWCNT units, DWCNT units and MWCNT units, and more particularly, may include MWCNT units at 20 wt % or more with respect to a total weight of the CNTs.

Meanwhile, when CNT units as a conductive material for a secondary battery have an excessively large diameter, the pore of an electrode also has an excessively large diameter, and thus electrode density may be degraded. Also, when used CNT units have an excessively small diameter, dispersed CNT units or CNTs are embedded in a space between electrode active material particles, and thus it is difficult to form sufficient pores. Accordingly, in CNTs that may be used in the present invention, a unit may have a diameter of, particularly, 20 to 150 nm, and more particularly, 20 to 80 nm in consideration of an effect of improving dispersibility of a conductive material and reducing the resistance of an electrode according to control of the diameter of a unit.

In addition, although the CNT units are not particularly limited in a length thereof, as the length of CNTs is longer, electric conductivity and strength of an electrode and storage retention of an electrolyte solution may be improved. However, when the length of CNTs is excessively long, dispersibility may be degraded. Accordingly, in CNTs that may be used in the present invention, a unit may have a length of, particularly, 0.5 to 100 μm. Also, in consideration of the diameter of CNT units, the CNT units may have an aspect ratio of 5 to 50,000, more particularly, 10 to 15,000, which is defined as a ratio of the length and diameter of CNTs.

Additionally, when the CNT units are branched, electric conductivity and strength of an electrode and storage retention of an electrolyte solution may be improved, but when an amount thereof is excessively large, dispersibility may be degraded. Accordingly, it is preferable that a content of branched CNT units in CNTs be appropriately controlled, which is possible through a grinding process performed when or after CNTs are prepared.

Meanwhile, the CNTs including such CNT units may have a ratio (TD/BD) of a true density and a bulk density of 30 to 120.

As conventional CNTs have low bulk density, excellent dispersibility may be exhibited, but when CNTs have excessively low bulk density, it is difficult to prepare a high-concentrated dispersion solution due to a significant increase in viscosity upon a dispersion process of CNTs. Also, upon the manufacture of an electrode using a conductive material, when a conductive material has excessively low true density, electric conductivity of the electrode may be degraded because there are many gaps inside a conductive material and a surface area is increased, and when a conductive material has excessively high true density, battery capacity may be degraded. Accordingly, in the present invention, excellent electric conductivity and improved battery performance may be exhibited when the CNTs are applied to an electrode by controlling a ratio of a bulk density and a true density within the above range. In consideration of a significant improvement effect according to control of a ratio of a bulk density and a true density, the CNTs that may be used in the present invention may have a ratio of a true density and a bulk density of 40 to 60.

In addition, the bulk density of CNTs may be determined by Equation 1 below, and the CNTs that may be used in the present invention may have a bulk density of, particularly, 20 to 80 kg/m³.

Bulk density (kg/m³)=Weight of CNTs (kg)/Volume of CNTs (m³) [Equation 1]

In the present invention, the bulk density of CNTs may be calculated by introducing CNTs into a 20 ml container, measuring a weight, and substituting the measured weight into Equation 1.

As such, when the diameter and bulk density of the CNT units are controlled at the same time, the conductive material that may be used in the present invention includes large-diameter CNT units and has low density, and thus may exhibit excellent dispersibility without degradation of electric conductivity in an electrode. In consideration of a significant improvement effect according to the control of bulk density, the CNTs may have a bulk density of, particularly, 30 to 70 kg/m³, more particularly, 30 to 60 kg/m³.

In addition, the CNTs that may be used in the present invention may have a true density of, particularly, 2,100 to 2,500 kg/m³ under a condition satisfying the ratio of a true density and a bulk density. In the present invention, the true density of CNTs may be measured by a common method of measuring a true density, and particularly, by using AccuPyc II-1340 commercially available from Micromeritics Instrument Corporation.

Additionally, the CNTs that may be used in the present invention exhibit a low BET specific surface area because a unit thereof has a large diameter as described above, and therefore, excellent dispersibility may be exhibited. Specifically, the CNTs that may be used in the present invention may have a BET specific surface area of 30 to 120 m²/g, particularly, 30 to 85 m²/g.

In the present invention, the specific surface area of CNTs is measured by a BET method, and particularly, may be calculated from the adsorption amount of nitrogen gas at the temperature of liquid nitrogen (77 K) using BELSORP-mini II commercially available from BEL Japan Inc.

In addition, the CNTs with a spherical secondary structure in which CNT units are entangled may have an average particle size ($D_{50}$) of 200 to 800 µm. In the present invention, the average particle size ($D_{50}$) of CNTs can be defined as a particle size corresponding to 50 percentile in the particle size distribution. Also, the average particle size ($D_{50}$) of CNTs may be measured, for example, by using a scanning electron microscope or laser diffraction. The average particle size ($D_{50}$) corresponding to 50 percentile in the particle size distribution may be calculated by laser diffraction, more particularly, by dispersing the CNTs in a solution and then introducing the dispersion solution into a commercially available laser diffraction particle size analysis instrument (e.g., Microtrac MT-3000).

Additionally, the CNTs may have a particle size distribution ($D_{cnt}$) of 0.5 to 1.0, which is defined by Equation 2 below.

$$D_{cnt}=[Dn_{90}-Dn_{10}]/Dn_{50}$$ [Equation 2]

In Equation 2, $Dn_{90}$ is a number average particle size which is measured based on 90% in an absorption mode using a Microtrac particle size analyzer after CNTs are introduced into distilled water, $Dn_{10}$ is a number average particle size measured based on 10%, and $Dn_{50}$ is a number average particle size measured based on 50% under the same conditions.

In addition, the CNTs may include a metal element derived from a main catalyst or a cocatalyst such as Fe, Co, Mo, V, Cr, or the like used in the preparation process at a content of 50 ppm or less, particularly, 5 ppm or less.

As such, further excellent conductivity may be exhibited without a concern about side reactions in an electrode by significantly reducing a content of a metal as a residual impurity in the CNTs.

In addition, the CNTs may have a packing volume resistivity of 0.01 to 0.02 ohm·cm at a packing density of 0.9 to 1.5 g/cc.

When the CNTs according to the present invention exhibit the above volume resistivity under the above condition of packing density, resistance in an electrode may be lowered when being applied to an electrode, and thus battery performance may be improved.

The conductive material including the CNTs according to an embodiment of the present invention may be prepared by a common method such as arc discharge, laser ablation, chemical vapor deposition or the like, and the above-described properties may be realized by controlling a type of catalyst, heat treatment temperature and atmosphere, a method of removing impurities and the like in the preparation process.

Specifically, the conductive material may be prepared by a method which includes preparing CNTs by bringing a supported catalyst in which a metal catalyst is supported in an α-alumina support in contact with a carbon source at equal to or greater than 650° C. and less than 800° C. (Step 1); and removing metal impurities in the CNTs through chlorination (Step 2).

Hereinafter, each step will be described in detail. In the step 1 for preparing a conductive material, CNTs are prepared by growing CNTs by chemical vapor synthesis through decomposition of a carbon source using the supported catalyst in which a metal catalyst is supported in an α-alumina support.

The preparation of CNTs through chemical vapor synthesis may be performed, particularly, by introducing the supported catalyst into a horizontal fixed bed reactor or a fluidized bed reactor, and injecting a carbon source; or a mixed gas of the carbon source, a reducing gas and a carrier gas above the pyrolysis temperature of the carbon source in a vapor phase to below the melting point of the supported metal catalyst. As such, when the mixed gas including a carbon source is injected, the carbon source is pyrolyzed at high temperature, and then permeated into a supported catalyst. When the pyrolyzed carbon source permeated into a supported catalyst is saturated, saturated carbon is precipitated from the supported catalyst, and thus a hexagonal ring structure is formed. The CNTs prepared by chemical vapor synthesis as described above exhibit the growth of crystal in a direction almost parallel to the tube axis and high crystallinity in a graphite structure in a lengthwise direction of a tube. Therefore, the unit has a small diameter, high electric conductivity and high strength. Also, the vapor grown CNTs may have an uneven and rough surface. Accordingly, excellent adhesion to an electrode active material may be exhibited upon formation of an electrode. In particular, when a carbon-based material is used as an electrode active material in a negative electrode of a secondary battery, the vapor grown CNTs exhibit much higher adhesion to a carbon-based active material, and thus the CNTs as an electric conductivity-providing agent can be adhered to a carbon-based active material without being separated even when charge and discharge cycles are repeated. Therefore, electric conductivity may be maintained and cycle characteristics may be further improved.

Specifically, the preparation of CNTs may be performed at equal to or greater than 650° C. and less than 800° C., particularly, 650 to 700° C. Within the reaction temperature range, it is possible to minimize generation of amorphous carbon, reduce the specific surface area of a prepared CNT, and simultaneously increase the diameter of CNT units. Also, since CNTs exhibit a decrease in weight while maintaining a bulk size as is, dispersibility according to a decrease in bulk density may be further improved. As a heat source for the heat treatment, induction heating, radiant heat, lasers, infrared radiation (IR), microwaves, plasma or surface plasmon heating or the like may be used.

In addition, the carbon source is not particularly limited as long as it can supply carbon and is present in a vapor phase at 300° C. or higher. Particularly, the carbon source may be a carbon-based compound having 6 or less carbon atoms, and more particularly, may be any one or a mixture of two or more of carbon monoxide, methane, ethane, ethylene, ethanol, acetylene, propane, propylene, butane, butadiene, pentane, pentene, cyclopentadiene, hexane, cyclohexane, benzene, toluene and the like.

Additionally, the mixed gas of a reducing gas and a carrier gas serves to transport a carbon source, prevent CNTs from being combusted at high temperature, and help decomposition of a carbon source.

The reducing gas may be a commonly known reducing gas, particularly, hydrogen or the like. Also, the carrier gas may be gas that is commonly used as a carrier gas upon the preparation of CNTs, particularly, nitrogen or the like.

Such a carbon source in a vapor phase, reducing gas and carrier gas may be used in various volume ratios. Specifically, the carbon source in a vapor phase may be used in a volume ratio of 0.5 to 1.5 based on 1 volume of the reducing gas, and the carrier gas may be used in a volume ratio of 0.5 to 1.5 based on 1 volume of the reducing gas. In this case, a flow rate of the mixed gas including the carbon source, reducing gas and carrier gas may be appropriately selected within a range of 50 to 10,000 sccm.

In addition, in the method of preparing the conductive material according to an embodiment of the present invention, a cooling process for further regularly arranging CNTs may be optionally further performed after CNTs are grown through the heat treatment as described above. The cooling process may be performed, particularly, by a natural cooling method according to the removal of a heat source or by using a cooler or the like.

Meanwhile, the supported catalyst that is used in the preparation of the conductive material is a catalyst in which a metal catalyst is supported in a spherical α-alumina support.

The α-alumina has very low utility as a catalyst support because it has very low porosity compared to γ-alumina. However, by controlling a calcining temperature upon the preparation of a supported catalyst including α-alumina as a support, when CNTs are synthesized using the supported catalyst, generation of amorphous carbon is suppressed, a specific surface area is decreased, and thus a diameter may be increased. Simultaneously, the bulk density of CNTs is decreased, and thus dispersibility may be improved.

Specifically, the α-alumina that may be used as a support in the present invention may have an average particle size ($D_{50}$) of 20 to 200 μm and a BET specific surface area of 1 to 50 $m^2/g$. Also, the α-alumina may have very low porosity, particularly, a porosity of 0.001 to 0.1 $cm^3/g$ due to its smooth surface.

Meanwhile, the supported catalyst including the spherical α-alumina as a support may be prepared by supporting a metal catalyst in the spherical α-alumina support and then calcining the supported metal catalyst. Specifically, the supported catalyst may be prepared by adding the spherical α-alumina support to a metal catalyst precursor solution prepared by dissolving a precursor of the metal catalyst in water, followed by mixing and calcining at 600° C. or less.

The metal catalyst supported in a support serves to help formation of a six-member ring structure by bonding carbon components in the carbon source in a vapor phase. As the metal catalyst, a main catalyst such as iron (Fe), nickel (Ni), cobalt (Co) or the like may be used alone, or the main catalyst together with a cocatalyst such as molybdenum (Mo), vanadium (V), chromium (Cr) or the like, that is, a main catalyst/cocatalyst composite catalyst may be used. Specifically, the composite catalyst may be any one or a mixture of two or more of FeCO, CoMo, CoV, FeCoMo, FeMoV, FeV, FeCoMoV and the like. Also, the cocatalyst may be used in an amount of 0.01 to 1 mole, particularly, 0.05 to 0.5 moles with respect to 1 mole of the main catalyst.

In the preparation of the supported catalyst, the precursor of the metal catalyst may be a metal salt, a metal oxide or the like, which can be dissolved in water. Particularly, the precursor of the metal catalyst may be a metal salt, a metal oxide or a metal halide including any one or two or more metal elements selected from Fe, Ni, Co, Mo, V, and Cr, and more particularly, may be any one or a mixture of two or more selected from the group consisting of $Fe(NO_3)_2 \cdot 6H_2O$, $Fe(NO_3)_2 \cdot 9H_2O$, $Fe(NO_3)_3$, $Fe(OAc)_2$, $Co(NO_3)_2 \cdot 6H_2O$, $Co_2(CO)_8$, $[Co_2(CO)_6(t\text{-}BuC\!\!=\!\!CH)]$, $Cu(OAc)_2$, $Ni(NO_3)_2 \cdot 6H_2O$, $(NH_4)_6Mo_7O_{24} \cdot 4H_2O$, $Mo(CO)_6$, $(NH_4)MoS_4$ and $NH_4VO_3$.

In addition, a precursor of the metal catalyst in an aqueous state in which the precursor is dissolved in water may be used. In this case, in consideration of impregnation efficiency and the like, a concentration of the precursor of the metal catalyst in an aqueous solution may be appropriately adjusted. Specifically, a concentration of the precursor of the metal catalyst in an aqueous solution may be 0.1 to 0.4 g/ml.

Additionally, in order to control the bulk density of CNTs, an organic acid may be optionally further used when an α-alumina support is added to and mixed with an aqueous solution including the precursor of the metal catalyst.

As such, when an organic acid is further added, in the metal catalyst precursor solution, the metal catalyst may be used in an amount of 3 to 40 moles, particularly, 5 to 30 moles with respect to 1 mole of the organic acid. The organic acid may be, particularly, one or a mixture of two or more of citric acid and the like.

Meanwhile, the mixing process of the metal catalyst precursor solution and the spherical α-alumina support may be performed by a common method, particularly, by rotation or stirring at 45 to 80° C.

In addition, in consideration of a content of a supported metal catalyst in a supported catalyst finally prepared through the mixing process, a metal catalyst precursor and a support may be mixed. In the supported catalyst, as an amount of a supported metal catalyst increases, the bulk density of CNTs prepared using a supported catalyst tends to be increased. In consideration of the bulk density of CNTs thus prepared, a metal catalyst may be mixed in such a way that the metal catalyst may be supported at 5 to 30 wt % with respect to the total weight of the supported catalyst finally prepared.

Additionally, a drying process may be optionally further performed prior to a calcining process after the mixing of the metal catalyst precursor solution and the spherical α-alumina support. The drying process may be performed by a common method, particularly, by rotary evaporation at 40 to 100° C. in a vacuum for 3 minutes to 1 hour.

Subsequently, a mixture of the metal catalyst precursor and the support prepared by the above method is subjected to calcination. The calcination may be performed at 600° C. or less, particularly, 400 to 600° C. under an air or inert atmosphere.

In addition, a pre-calcining process may be optionally further performed at 250 to 400° C. prior to the calcining process after the drying process.

In this case, in consideration of reaction efficiency, the α-alumina support is impregnated with a maximum of 50% of the mixture of the metal catalyst precursor and the support for use immediately before the pre-calcining process, and the α-alumina support is impregnated with the remaining mixture immediately after the pre-calcining process for use.

As a result of the preparation process as described above, a supported catalyst in which the metal catalyst is supported in the aluminum-based support may be obtained.

Specifically, the supported catalyst has a single-layer or multi-layer structure having two or more layers in which a metal catalyst is applied on a surface of a spherical α-alumina support. The supported catalyst may have a structure of a continuous coating layer or a discontinuous coating layer, and particularly, may have a structure of a discontinuous coating layer.

In addition, the supported catalyst may have an average particle size ($D_{50}$) of 30 to 150 μm and a BET specific surface area of 1 to 50 m²/g. Also, the supported catalyst may have a surface roughness of 10 to 50 nm when observed through a SEM.

Additionally, the supported catalyst may have a number average particle size within 5%, particularly, 3% when a particle size of 32 μm or less is defined as an ultrasonic fine powder amount in consideration of the average particle size of the α-alumina support.

The ultrasonic fine powder is an aggregate of metal catalysts adhered in an island form to the supported catalyst, and is not sieved when passing through a sieve. However, the ultrasonic fine powder is detached therefrom upon ultrasonication because it is weakly adhered to the supported catalyst. This material has a different particle size from that of a metal catalyst which is well applied on a support and also has different catalytic activity. In the present invention, the ultrasonic fine powder amount means an amount of a fine powder of a number average particle size measured through a particle size analyzer after ultrasonication.

Meanwhile, in the step 2 of the method of preparing a conductive material according to an embodiment of the present invention, metal impurities in CNTs prepared using a supported catalyst in step 1 are removed.

Specifically, the step 2 may be performed by chlorinating a metal present as an impurity in the CNTs prepared in step 1 and then evaporating the chlorinated metal at high temperature. When the above method is performed, metal components in CNTs may be removed to below 50 ppm without a concern about degradation of properties of CNTs caused by the occurrence of defects compared to a conventional method of removing a metal component using a strong acid, and there is also no concern about environmental pollution caused by the generation of a strong acidic waste liquid. Also, during the removing process of metal impurities, properties of CNTs such as bulk density, packing density and the like may be further varied and controlled.

Specifically, the removing process of metal impurities may include chlorinating a metal in the CNTs by bringing the CNTs prepared in step 1 in contact with a chlorine source under a nitrogen or vacuum atmosphere at 450 to 900° C.; and removing the chlorinated metal by evaporation through heating.

The removing process of metal impurities may be performed by using a fluidized bed reactor and a static furnace. Specifically, the removing process may be performed by filling CNTs in a quartz tube reactor capable of introducing and discharging gas, raising a temperature to 450 to 900° C. using a static furnace under a nitrogen or vacuum atmosphere, bringing CNTs in contact with a chlorine source which is supplied through a gas inlet to chlorinate metal impurities in CNTs, and then evaporating the chlorinated metal under a nitrogen or vacuum atmosphere after raising the temperature in the reactor.

In this case, the chlorine source may be $Cl_2$, $CHCl_3$ or the like.

In addition, a temperature of the heat treatment for removing the chlorinated metal may be 800 to 1,500° C. When a temperature of the heat treatment is less than 800° C., the removal efficiency of the chlorinated metal may be degraded, and when a temperature thereof is greater than 1,500° C., a side reaction may occur.

As a result of the process of removing metal impurities, it is possible to reduce a main catalyst such as Fe, Ni, Co or the like or cocatalyst-derived metal impurities in CNTs to 50 ppm or less, particularly, 5 ppm or less. In the present invention, contents of metal impurities remaining in CNTs may be analyzed using high-frequency inductively coupled plasma (ICP).

The conductive material including the CNTs prepared by the above method includes large-diameter CNT units and simultaneously exhibits low density. Therefore, when used to prepare a composition for forming an electrode of a secondary battery, the conductive material may exhibit excellent dispersibility in the composition. Also, when the conductive material which exhibits high purity and increased conductivity in an electrode is applied to a battery, battery performance, particularly, battery performance at room temperature and low temperature may be improved.

The conductive material according to an embodiment of the present invention may further include a particulate carbon-based material in addition to the CNTs.

In the present invention, the term "particulate" refers to a particle which has a predetermined shape and is independently present and separable. In the present invention, the particulate carbon-based material may have various shapes such as a spherical shape, an elliptical shape, a conical shape, a flake shape, a fibrous shape and the like, and particularly, encompasses a spherical shape or a substantially spherical shape such as a case where a cross section has an elliptical shape such as a potato shape. More particularly, the particulate carbon-based material may have an average circularity of 0.9 to 1.0, which is measured using a flow particle image analyzer or is determined from the length ratio of a long axis and a short axis of a particle observed through a SEM.

In the conductive material, the particulate carbon-based material may be, particularly, a spherical particle having an average particle size ($D_{50}$) of 10 to 45 nm and a BET specific surface area of 40 to 170 $m^2/g$. When the particulate carbon-based material has a small particle size and a large specific surface area, which satisfy the above ranges, electron injection properties in a triple-phase boundary among electrode active materials and an electrolyte upon the manufacture of an electrode are increased, and thus reactivity may be improved. When the particulate carbon-based material has an average particle size of less than 10 nm or a BET specific surface area of greater than 170 $m^2/g$, dispersibility in an electrode mixture may be significantly degraded due to agglomeration among particulate carbon-based materials. Also, when the particulate carbon-based material has an average particle size of greater than 45 nm or a BET specific surface area of less than 40 $m^2/g$, a conductive material may be not uniformly dispersed throughout a positive electrode mixture and may be partially concentrated due to its significantly large size when a conductive material is disposed according to the porosity of the positive electrode active material. More particularly, in consideration of a significant effect of the average particle size and specific surface area of a particulate carbon-based material on reactivity of a positive electrode mixture, the particulate carbon-based material may have an average particle size ($D_{50}$) of 30 to 45 nm and a BET specific surface area of 40 to 120 $m^2/g$. Also, in the present invention, the specific surface area of the particulate carbon-based material may be calculated from the adsorption amount of nitrogen gas at the temperature of liquid nitrogen (77 K) using BELSORP-mini II commercially available from BEL Japan Inc.

In the present invention, the average particle size ($D_{50}$) of the particulate carbon-based material may be defined as a particle size corresponding to 50 percentile in the particle size distribution. Also, the average particle size ($D_{50}$) of the particulate carbon-based material may be measured, for example, by using laser diffraction, and particularly, the average particle size ($D_{50}$) corresponding to 50 percentile in the particle size distribution may be calculated by dispersing the conductive material in a solution, and then introducing the dispersion solution into a commercially available laser diffraction particle size analysis instrument (e.g., Microtrac MT-3000).

The particulate carbon-based material is not particularly limited as long as it has conductivity and simultaneously satisfies morphological conditions thereof. In consideration of an excellent improvement effect according to the use of a particulate conductive material, the particulate carbon-based material may be a non-graphite-based carbon material. Specifically, the particulate carbon-based material may be any one or a mixture of two or more of carbon black, acetylene black, Ketjen black, channel black, furnace black, lamp black, thermal black, Denka black and the like. More particularly, in consideration of a significant improvement effect when being used in combination of the CNTs, the particulate carbon-based material may be carbon black.

The particulate carbon-based material may be included by simple mixing or complexation through a method such as coating or the like with the CNTs in the conductive material according to an embodiment of the present invention. Also, the particulate carbon-based material may be included at 50 to 200 parts by weight with respect to 100 parts by weight of the CNTs. When the particulate carbon-based material is included within the above content range, an improvement effect on battery characteristics according to a mixed use may be further improved.

According to another embodiment of the present invention, there is provided an electrode for a secondary battery which includes the above-described conductive material.

The electrode for a secondary battery may be a positive electrode or a negative electrode, and particularly, may be a positive electrode. Also, the electrode may be manufactured by a common method except that the above-described conductive material is included.

Specifically, when the electrode is a positive electrode, the positive electrode includes a positive electrode current collector and a positive electrode active material layer formed on the positive electrode current collector.

The positive electrode current collector is not particularly limited as long as it does not cause a chemical change in the battery and has conductivity. For example, the positive electrode current collector may be stainless steel, aluminum, nickel, titanium, calcined carbon, or aluminum or stainless steel whose surface is treated with carbon, nickel, titanium, silver or the like. Also, the positive electrode current collector may commonly have a thickness of 3 to 500 µm, and may have fine irregularities at a surface thereof to increase adhesion of the positive electrode active material. For example, the positive electrode current collector may be used in any of various forms such as a film, a sheet, a foil, a net, a porous material, a foam, a non-woven fabric and the like.

The positive electrode active material layer formed on the positive electrode current collector may further include a positive electrode active material, a conductive material, and optionally, a binder.

The positive electrode active material may be a compound capable of reversible intercalation and deintercalation of lithium ions (lithiated intercalation compound), particularly, a composite metal oxide of lithium and a metal such as cobalt, manganese, nickel or a combination thereof.

More particularly, the positive electrode active material may be lithium-manganese-based oxides (e.g., $LiMnO_2$, $LiMn_2O$ or the like), lithium-cobalt-based oxides (e.g., $LiCoO_2$ or the like), lithium-nickel-based oxides (e.g., $LiNiO_2$ or the like), lithium-nickel-manganese-based oxides (e.g., $LiNi_{1-Y}Mn_YO_2$ (here, 0<Y<1), $LiMn_{2-Z}Ni_ZO_4$ (here, 0<Z<2) or the like), lithium-nickel-cobalt-based oxides (e.g., $LiNi_{1-Y}Co_YO_2$ (here, 0<Y<1) or the like), lithium-manganese-cobalt-based oxides (e.g., $LiCo_{1-Y}Mn_YO_2$ (here, 0<Y<1), $LiMn_{2-Z}Co_ZO_4$ (here, 0<Z<2) or the like), lithium-nickel-manganese-cobalt-based oxides (e.g., $Li(Ni_PCo_QMn_R)O_2$ (here, 0<P<1, 0<Q<1, 0<R<1 and P+Q+R=1), $Li(Ni_PCo_QMn_R)O_4$ (here, 0<P<2, 0<Q<2, 0<R<2 and P+Q+R=2)

or the like), or lithium-nickel-cobalt-transition metal (M) oxides (e.g., $Li(Ni_PCo_QMn_RM_S)O_2$ (here, M is selected from the group consisting of Al, Fe, V, Cr, Ti, Ta, Mg and Mo, and P, Q, R and S represent an atomic fraction of each independent element, and satisfy 0<P<1, 0<Q<1, 0<R<1, 0<S<1 and P+Q+R+S=1) or the like). Also, the lithium-transition metal oxides may be doped with tungsten (W) or the like. Among these compounds, the positive electrode active material may be $LiCoO_2$, $LiMnO_2$, $LiNiO_2$, lithium-nickel-manganese-cobalt-based oxides (e.g., $Li(Ni_{0.6}Mn_{0.2}Co_{0.2})O_2$, $LiNi_{0.5}Mn_{0.3}Co_{0.2}O_2$, $LiNi_{0.8}Mn_{0.1}Co_{0.1}O_2$ or the like), lithium-nickel-cobalt-aluminum-based oxides (e.g., $LiNi_{0.8}Co_{0.15}Al_{0.05}O_2$ or the like) in that it is possible to increase capacity characteristics and stability of the battery.

The positive electrode active material may be included at 70 to 98 wt % with respect to the total weight of the positive electrode active material layer based on a solid content. When the positive electrode active material is included at less than 70 wt %, capacity may be degraded, and when the positive electrode active material is included at greater than 98 wt %, adhesion to a positive electrode current collector and conductivity may be degraded due to a relative decrease in contents of a binder and a conductive material.

In addition, the conductive material is the same as described above, and may be included at 1 to 30 wt % with respect to the total weight of the positive electrode active material layer.

Additionally, the binder serves to improve attachment between positive electrode active material particles and adhesion between a positive electrode active material and a current collector. As a specific example, the binder may be any one or a mixture of two or more of polyvinylidenefluoride (PVDF), a polyvinylidenefluoride-hexafluoropropylene copolymer (PVDF-co-HFP), polyvinyl alcohol, polyacrylonitrile, carboxymethyl cellulose (CMC), starches, hydroxypropyl cellulose, regenerated cellulose, polyvinyl pyrrolidone, tetrafluoroethylene, polyethylene, polypropylene, an ethylene-propylene-diene polymer (EPDM), a sulfonated EPDM, styrene-butadiene rubber (SBR), fluororubber, various copolymers thereof and the like. The binder may be included at 1 to 30 wt % with respect to the total weight of the positive electrode active material layer.

The positive electrode may be manufactured by a common method of manufacturing a positive electrode except that the above-described conductive material is used. Specifically, the positive electrode may be manufactured by applying a composition for forming a positive electrode active material layer prepared by dispersing or dissolving the positive electrode active material, the binder, and, optionally, the conductive material in a solvent on a positive electrode current collector, followed by drying and rolling; or by casting the composition for forming a positive electrode active material layer on a separate support and then laminating a film obtained by peeling off from the support on a positive electrode current collector.

In this case, the solvent may be a solvent generally used in the art without particular limitation. Specifically, the solvent may be any one or a mixture of two or more of dimethyl sulfoxide (DMSO), isopropyl alcohol, N-methyl pyrrolidone (NMP), acetone, water and the like. The solvent is used in an amount just enough to have the degree of viscosity which enables the positive electrode active material, the conductive material and the binder to be dissolved or dispersed and exhibits excellent uniformity of a thickness upon later application for manufacturing a positive electrode in consideration of a thickness of an applied slurry and manufacturing yield.

In addition, when the electrode is a negative electrode, the negative electrode includes a negative electrode current collector and a negative electrode active material layer disposed on the negative electrode current collector.

Such a negative electrode current collector is not particularly limited as long as it does not cause a chemical change in the battery and has high conductivity. For example, the negative electrode current collector may be copper, stainless steel, aluminum, nickel, titanium, calcined carbon, or copper or stainless steel whose surface is treated with carbon, nickel, titanium, silver or the like, an aluminum-cadmium alloy or the like. Also, the negative electrode current collector may commonly have a thickness of 3 to 500 μm, and like a positive electrode current collector, may have fine irregularities at a surface thereof to increase adhesion of the negative electrode active material. For example, the negative electrode current collector may be used in any of various forms such as a film, a sheet, a foil, a net, a porous material, a foam, a non-woven fabric and the like.

In addition, the negative electrode active material layer may include a negative electrode active material, a conductive material, and optionally, a binder.

The negative electrode active material may be a compound capable of reversible intercalation and deintercalation of lithium ions. As a specific example, the negative electrode active material may be any one or a mixture of two or more of a carbon material such as artificial graphite, natural graphite, graphitized carbon fiber, amorphous carbon or the like; a metal compound capable of alloying with lithium such as Si, Al, Sn, Pb, Zn, Bi, In, Mg, Ga, Cd, a Si alloy, a Sn alloy, an Al alloy or the like; a metal oxide capable of doping and dedoping lithium such as $SiO_x$ (0<x<2), $SnO_2$, vanadium oxide or lithium vanadium oxide; and a composite including the metal compound and the carbon material such as a Si—C composite or a Sn—C composite. Also, the negative electrode active material may be a lithium metal thin-film. In addition, as the carbon material, low-crystallinity carbon, high-crystallinity carbon and the like all may be used. A representative example of the low-crystallinity carbon may be soft carbon and hard carbon, and a representative example of the high-crystallinity carbon may be high-temperature calcined carbon such as amorphous, platy, flake, spherical or fibrous natural graphite or artificial graphite, kish graphite, pyrolytic carbon, mesophase pitch-based carbon fiber, meso-carbon microbeads, mesophase pitches, petroleum or coal tar pitch-derived cokes or the like.

In addition, the binder and the conductive material may be the same as described above for the positive electrode.

The negative electrode may be manufactured by applying a composition for forming a negative electrode prepared by dispersing or dissolving a negative electrode active material, a conductive material, and optionally, a binder in a solvent on a negative electrode current collector, followed by drying; or by casting the composition for forming a negative electrode on a separate support and then laminating a film obtained by peeling off from the support on a negative electrode current collector. In this case, the solvent may be the same as described above for the positive electrode.

According to still another embodiment of the present invention, there is provided an electrochemical device including the above-described electrode. The electrochemical device may be, particularly, a battery, a capacitor or the like, and particularly, may be a lithium secondary battery.

The lithium secondary battery includes, particularly, a positive electrode, a negative electrode disposed at a position facing the positive electrode, a separator interposed between the positive electrode and the negative electrode and an electrolyte. Here, at least one of the positive electrode and the negative electrode may be the above-described electrode. Also, the lithium secondary battery may optionally further include a battery container accommodating an electrode assembly of the positive electrode, the negative electrode and the separator, and a sealing member for sealing the battery container.

In the lithium secondary battery, the separator serves to separate the negative electrode and the positive electrode and provide a flow passage for lithium ions. The separator is not particularly limited as long as it is used as a separator in a common lithium secondary battery, and particularly, a separator which exhibits low resistance to migration of electrolyte ions and has an excellent ability of absorbing an electrolyte solution is preferable. Specifically, the separator may be, for example, a porous polymer film made of a polyolefin-based polymer such as an ethylene homopolymer, a propylene homopolymer, an ethylene/butene copolymer, an ethylene/hexene copolymer, an ethylene/methacrylate copolymer or the like, or a stacked structure having two or more layers made thereof. Alternatively, the separator may be a common porous non-woven fabric, for example, a non-woven fabric made of glass fiber with a high melting point, polyethylene terephthalate fiber or the like. Also, in order to ensure heat resistance or mechanical strength, the separator may be a coated separator including ceramic components or polymer materials, and optionally, may be used in a single-layer or multi-layer structure.

The electrolyte used in the present invention may be an organic liquid electrolyte, an inorganic liquid electrolyte, a solid polymer electrolyte, a gel polymer electrolyte, an inorganic solid electrolyte, a molten-type inorganic electrolyte or the like, which may be used in the manufacture of a lithium secondary battery, but the present invention is not limited thereto.

Specifically, the electrolyte may include an organic solvent and a lithium salt.

The organic solvent is not particularly limited as long as it may act as a medium capable of migrating ions involved in an electrochemical reaction of a battery. Specifically, the organic solvent may be an ester-based solvent such as methyl acetate, ethyl acetate, γ-butyrolactone, ε-caprolactone or the like; an ether-based solvent such as dibutyl ether, tetrahydrofuran or the like; a ketone-based solvent such as cyclohexanone or the like; an aromatic hydrocarbon-based solvent such as benzene, fluorobenzene or the like; a carbonate-based solvent such as dimethyl carbonate (DMC), diethyl carbonate (DEC), methyl ethyl carbonate (MEC), ethyl methyl carbonate (EMC), ethylene carbonate (EC), propylene carbonate (PC) or the like; an alcohol-based solvent such as ethyl alcohol, isopropyl alcohol or the like; nitriles such as R—CN (R is a C2 to C20 hydrocarbon group with a linear, branched or cyclic structure and may include a double-bond aromatic ring or an ether linkage) or the like; amides such as dimethylformamide or the like; dioxolane such as 1,3-dioxolane or the like; or sulfolane. Among these compounds, the carbonate-based solvent is preferable, and a mixture of a cyclic carbonate having high ionic conductivity and a high dielectric constant, which are capable of increasing the charging and discharging performance of a battery (e.g., EC, PC or the like) and a linear carbonate-based compound with low viscosity (e.g., EMC, DMC, DEC or the like) is more preferable. In this case, when the cyclic carbonate and chain carbonate are mixed at a volume ratio of about 1:1 to about 1:9 for use, excellent performance of an electrolyte solution may be exhibited.

The lithium salt is not particularly limited as long as it can provide a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, $LiB(C_2O_4)_2$ or the like. The concentration of the lithium salt is preferably within 0.1 to 2.0 M. When the concentration of the lithium salt is within the above range, an electrolyte has appropriate conductivity and viscosity, and thus excellent performance of the electrolyte may be exhibited and lithium ions may be effectively migrated.

In addition to the electrolyte components, for the purpose of improving lifespan characteristics of the battery, suppressing a decrease in battery capacity, improving discharge capacity of the battery and the like, the electrolyte may further include one or more additives such as a halogenated carbonate-based compound such as difluoroethylene carbonate or the like, pyridine, triethyl phosphite, triethanolamine, a cyclic ether, ethylene diamine, n-glyme, hexaphosphoric triamide, nitrobenzene derivatives, sulfur, quinoneimine dyes, N-substituted oxazolidinone, N,N-substituted imidazolidine, ethylene glycol dialkyl ethers, ammonium salts, pyrrole, 2-methoxyethanol, aluminum trichloride and the like. In this case, the additives may be included at 0.1 to 5 wt % with respect to the total weight of the electrolyte.

As described above, the lithium secondary battery including the electrode manufactured using the conductive material according to the present invention may stably exhibit excellent discharge capacity, output characteristics and a capacity retention rate due to a decrease in resistance caused by an increase in electric conductivity in the electrode. As a result, the lithium secondary battery is useful in the portable devices such as mobile phones, notebook PCs, digital cameras and the like and the electric vehicles such as a hybrid electric vehicle (HEV) and the like.

According to yet another embodiment of the present invention, there are provided a battery module including the above-described lithium secondary battery as a unit cell and a battery pack including the same.

The battery module or the battery pack may be used as any one or more power sources of medium- to large-sized devices such as a power tool; an electric vehicle including an electric vehicle (EV), an HEV and a plug-in hybrid electric vehicle (PHEV); and a system for storing electric power.

Hereinafter, the present invention will be described in detail with reference to embodiments so that those skilled in the art can easily carry out the present invention. However, the present invention may be implemented in several different forms, and therefore, is not limited to embodiments described herein.

PREPARATION EXAMPLE

Preparation of Supported Catalyst

As a metal catalyst precursor, a solution in which 2.391 mg of $Fe(NO_3)_2 \cdot 9H_2O$, 7.341 mg of $Co(NO_3)_2 \cdot 6H_2O$, 0.552 mg of $(NH_4)_6Mo_7O_{24}$ and 0.344 mg of $NH_4VO_3$ were completely dissolved in 15.0 ml of distilled water was prepared. The solution thus prepared was added to 12.5 mg of spherical α-$Al_2O_3$ (pore volume: 0.01 cm³/g, BET specific surface area: 4.9 m²/g, product commercially available from Saint Gobain) as a support, followed by aging while stirring in a thermostat reactor including a 100° C. reflux bath for 15 hours.

The aged substance was dried in a rotary vacuum device at 100 rpm and 150 mbar in a 60° C. thermostat bath for 30 minutes, then 15 ml of ethanol was added thereto, the mixture was mixed, dispersed at 100 rpm, and dried, which were repeatedly performed twice. The dried substance thus obtained was first calcined at 350° C., and second calcined in air at 600° C. for 3 hours, thereby preparing a spherical and uniform supported catalyst (metals were included at a content of 18.1 parts by weight (Fe: 2.6 parts by weight, Co: 11.9 parts by weight, Mo: 2.4 parts by weight and V: 1.2 parts by weight) with respect to 100 parts by weight of the $\alpha$-$Al_2O_3$ support).

Example 1-1

Preparation of Conductive Material

The supported catalyst prepared in Preparation Example was used to synthesize CNTs in a laboratory-scale fluidized bed reactor.

Specifically, the supported catalyst prepared in Preparation Example was mounted in the center of a quartz tube having an inner diameter of 55 mm, and a synthesizing temperature was raised to 670° C. under a nitrogen atmosphere and then maintained. Afterward, while nitrogen, hydrogen and ethylene gas flowed in a volume mixing ratio of the same ratio (volume ratio of 1:1:1) at a speed of 60 sccm/min, a reaction was induced for 2 hours, thereby synthesizing CNTs.

The synthesized CNTs were charged in a reactor composed of a quartz tube, a temperature of the reactor was then raised to 900° C. under vacuum. After a target temperature was reached, chlorine gas ($Cl_2$) in a vapor phase was supplied to the reactor for 15 minutes to perform a chlorination process. Afterward, a temperature of the reactor was raised to 1,200° C., and nitrogen gas was injected to remove metal chloride in the CNTs.

Example 1-2 and Comparative Examples 1-1 and 1-2

Preparation of Conductive Material

A conductive material was prepared in the same manner as in Example 1-1 except that conditions listed in Table 1 below were used.

Comparative Example 1-3

Preparation of Conductive Material

CNTs were prepared in the same manner as in Example 1-1 except that conditions listed in Table 1 below were used.

The CNTs thus prepared were impregnated with a hydrochloric acid solution (4 N), and then kept at room temperature overnight to remove metal chloride in the CNTs. Afterward, the resulting CNTs were washed with water and dried, thereby preparing a conductive material.

TABLE 1

| | | Preparation process of CNTs | | Removal process of metal impurities in CNTs | | |
|---|---|---|---|---|---|---|
| | Supported catalyst (metal catalyst/ supporting material) | Synthesizing temperature (° C.) | Chlorine source | Chlorinating temperature (° C.) | Controlling temperature of metal chloride (° C.) | Gaseous atmosphere upon removal of metal impurities |
| Example 1-1 | FeCoMoV/$\alpha$-alumina | 670 | $Cl_2$ | 900 | 1,200 | Vacuum |
| Example 1-2 | FeCoMoV/$\alpha$-alumina | 720 | $CHCl_3$ | 750 | 900 | $N_2$ flow |
| Comparative Example 1-1 | FeCoMoV/$\gamma$-alumina | 700 | $Cl_2$ | 900 | 1,200 | Vacuum |
| Comparative Example 1-2 | FeCoMoV/$\alpha$-alumina | 800 | $Cl_2$ | 900 | 1,200 | Vacuum |
| Comparative Example 1-3 | FeCoMoV/$\alpha$-alumina | 670 | liquid purification using hydrochloric acid | | | |
| Comparative Example 1-4 | FeCoMoV/$\alpha$-alumina | 550 | $Cl_2$ | 900 | 1,200 | Vacuum |
| Comparative Example 1-5 | FeCoMoV/$\alpha$-alumina | 760 | No purification process | | | |

Experimental Example 1

The CNTs prepared in Example 1-1 and Comparative Example 1-1 were observed using a scanning electron microscope (SEM), results of which are shown in FIGS. 1a to 2b, respectively.

As a measurement result, the CNTs according to Example 1-1 and the CNTs according to Comparative Example 1-1 had a secondary structure in which units in a tube shape having an equivalent level of diameter were entangled. However, it can be confirmed that the CNT units prepared by the method according to the present invention had longer length and high straightness compared to Comparative Example 1-1. Also, it can be confirmed that a spherical particle with a secondary structure in Example 1-1 had a much larger particle size than that in Comparative Example 1-1.

Experimental Example 2

For the conductive materials prepared in Examples 1-1 and 1-2, Comparative Examples 1-1, 1-2, 1-3, 1-4 and 1-5, the secondary structure form, average particle size, average circularity, purity, BET specific surface area, bulk density, true density, and a content of metal impurities of the CNTs, and a diameter of a unit constituting the CNTs were measured as follows, results of which are shown in Table 2 below.

1) Form, average particle size ($D_{50}$) and average circularity of CNTs: The average particle size and secondary structure form of the CNTs were observed using a SEM.

In addition, the average circularity was measured from the length ratio of a long axis and a short axis in the observed CNTs.

2) Diameter of CNT unit: The diameter of a CNT unit was measured using a SEM and a BET method.

3) Purity: The purity of the CNTs was measured through an ash test.

4) Content of metal impurities: ICP analysis was performed.

5) BET specific surface area: The BET specific surface area was calculated from the adsorption amount of nitrogen gas at the temperature of liquid nitrogen (77 K) using BELSORP-mini II commercially available from BEL Japan Inc.

6) Bulk density: The bulk density was calculated by introducing CNTs into a 20 ml container and measuring a weight.

7) True density: The true density was measured using AccuPyc II-1340 commercially available from Micromeritics Instrument Corporation.

Experimental Example 3

Figure 3:
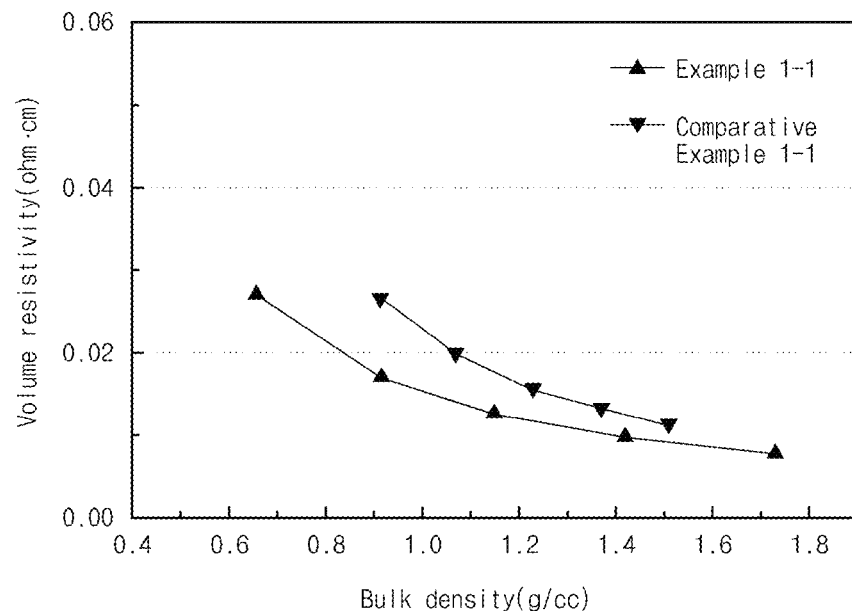
FIG. 3 is a graph illustrating measurement results of packing resistance of the conductive materials according to Example 1-1 and Comparative Example 1-1.

For the CNTs synthesized in Example 1-1 and Comparative Example 1-1, a packing volume resistivity was measured, results of which are shown in FIG. 3.

As a result, the CNTs according to Example 1-1 exhibited a packing volume resistivity of 0.01 to 0.025 ohm·cm at a packing density of 0.9 to 1.5 g/cc, which was low compared to the CNTs according to Comparative Example 1-1 in the section of the same packing density.

Example 2-1

Manufacture of Positive Electrode and Lithium Secondary Battery

The conductive material prepared in Example 1-1 was used to manufacture a positive electrode for a lithium secondary battery and a lithium secondary battery.

Specifically, a positive electrode active material, a conductive material and PVDF as a binder were mixed in N-methyl pyrrolidone (NMP) as a solvent in a weight ratio of 95:2.5:2.5 to prepare a composition for forming a positive electrode (viscosity: 5,000 mPa·s). The composition was applied on an aluminum current collector, then dried at 130° C. and rolled, thereby manufacturing a positive electrode. In this case, as the conductive material, carbon black (CB) ($D_{50}$=50 nm, BET specific surface area=49 $m^2/g$) and the conductive material prepared in Example 1-1 were mixed at contents listed in Table 3 below for use.

In addition, natural graphite as a negative electrode active material, CB as a conductive material and PVDF as a binder

TABLE 2

| | Example 1-1 | Example 1-2 | Comparative Example 1-1 | Comparative Example 1-2 | Comparative Example 1-3 | Comparative Example 1-4 | Comparative Example 1-5 |
|---|---|---|---|---|---|---|---|
| Secondary structure form | Entangled | Entangled | Entangled | Entangled | Entangled | Entangled | Entangled |
| Diameter of unit (nm) | 50 | 80 | 10 | 500 | 50 | 50 | 60 |
| Average particle size of secondary structure $D_{50}$ (μm) | 530 | 620 | 453 | 820 | 730 | 220 | 520 |
| Average circularity of secondary structure | 1 | 1 | 1 | 1 | 1 | 1 | 1 |
| Purity (wt %) | 93.0 | 95.1 | 97.5 | 95.9 | 99.5 | 65 | 92.0 |
| ICP analysis (ppm) Fe | <1 | <1 | <1 | <1 | 100 | <1 | 250 |
| Co | <10 | 40 | <10 | <10 | 350 | <10 | 3,500 |
| Mo | <1 | <1 | <1 | <1 | 500 | <1 | 500 |
| V | <1 | <1 | <1 | <1 | 250 | <1 | 250 |
| Cr | <1 | <1 | <1 | <1 | — | <1 | — |
| BET specific surface area ($m^2/g$) | 83 | 67 | 190 | 10 | 86 | 74 | 71 |
| Bulk density ($kg/m^3$) | 52 | 40 | 140 | 10 | 90 | 21 | 56 |
| True density ($kg/m^3$) | 2181 | 2240 | 2167 | 1802 | 2110 | 2780 | 2181 | were mixed in NMP as a solvent in a weight ratio of 85:10:5 to prepare a composition for forming a negative electrode, and the composition was applied on a copper current collector, thereby manufacturing a negative electrode.

A porous polyethylene separator was interposed between the positive electrode and the negative electrode thus manufactured to manufacture an electrode assembly, the electrode assembly was disposed in a case, and then an electrolyte solution was injected into the inside of the case, thereby manufacturing a lithium secondary battery. In this case, the electrolyte solution was prepared by dissolving 1.0 M lithium hexafluorophosphate (LiPF$_6$) in an organic solvent composed of ethylene carbonate/dimethyl carbonate/ethyl methyl carbonate (volume mixing ratio of EC/DMC/EMC=3/4/3).

Example 2-2

Manufacture of Positive Electrode and Lithium Secondary Battery

A positive electrode and a lithium secondary battery were manufactured in the same manner as in Example 2-1 except that the CNTs prepared in Example 1-2 were used as a conductive material for forming a positive electrode.

Example 3

Manufacture of Positive Electrode and Lithium Secondary Battery

A positive electrode and a lithium secondary battery were manufactured in the same manner as in Example 2-1 except that the CNTs prepared in Example 1-1 were used alone at 1.3 wt % as a conductive material for forming a positive electrode as listed in Table 3 below.

Comparative Examples 2-1 to 2-5

Manufacture of Positive Electrode and Lithium Secondary Battery

A positive electrode and a lithium secondary battery were manufactured in the same manner as in Example 2-1 except that respective CNTs prepared in Comparative Examples 1-1 to 1-5 were used at a content listed in Table 3 below as a conductive material for forming a positive electrode.

Comparative Example 3

Manufacture of Positive Electrode and Lithium Secondary Battery

A positive electrode and a lithium secondary battery were manufactured in the same manner as in Example 2-1 except that CB was used alone at 1.7 wt % as a conductive material for forming a positive electrode as listed in Table 3 below.

TABLE 3

| | CNT | CB[1] |
|---|---|---|
| Example 2-1 | Example 1-1 (0.7 wt %) | CB (0.7 wt %) |
| Example 2-2 | Example 1-2 (0.7 wt %) | CB (0.7 wt %) |
| Example 3 | Example 1-1 (1.3 wt %) | — |
| Comparative Example 2-1 | Comparative Example 1-1 (0.7 wt %) | CB (0.7 wt %) |
| Comparative Example 2-2 | Comparative Example 1-2 (0.7 wt %) | CB (0.7 wt %) |
| Comparative Example 2-3 | Comparative Example 1-3 (0.7 wt %) | CB (0.7 wt %) |
| Comparative Example 2-4 | Comparative Example 1-4 (0.7 wt %) | CB (0.7 wt %) |
| Comparative Example 2-5 | Comparative Example 1-5 (0.7 wt %) | CB (0.7 wt %) |
| Comparative Example 3 | — | CB (1.7 wt %) |

In Table 3, CB[1] is carbon black with a spherical particle shape (D$_{50}$=50 nm, BET specific surface area=49 m$^2$/g and average circularity=1)

Experimental Example 4

For the lithium secondary batteries according to Examples 2-1 and 2-2, Example 3, Comparative Examples 2-1 to 2-5, and Comparative Example 3, battery characteristics were evaluated at room temperature (25° C.) as follows.

Figure 4:
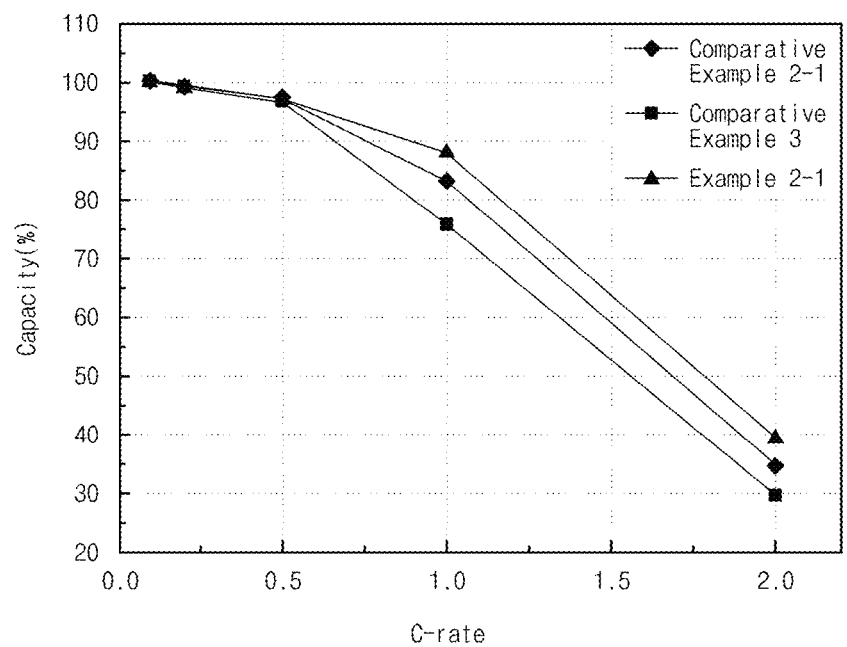
FIG. 4 is a graph illustrating observation results of rate characteristics of the lithium secondary batteries according to Example 2-1 and Comparative Examples 2-1 and 3 at room temperature (25° C.).
Figure 5:
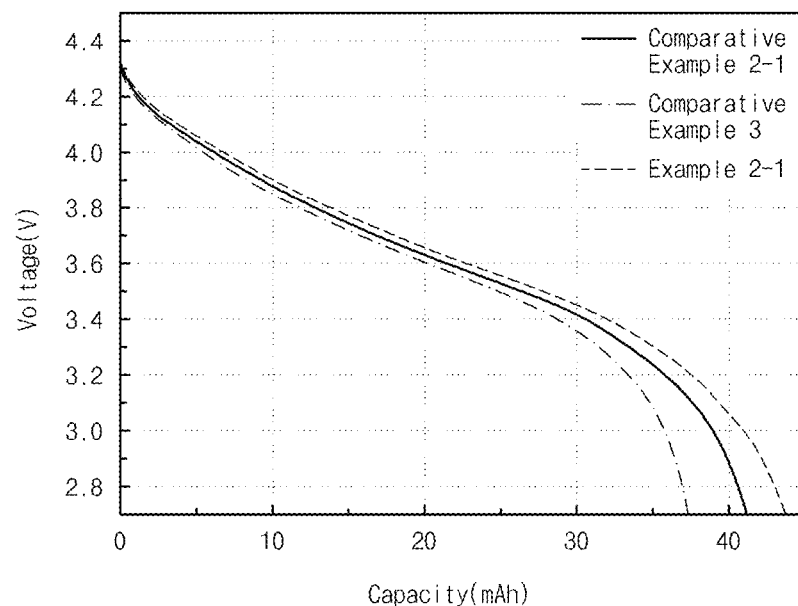
FIG. 5 is a graph illustrating observation results of output characteristics upon discharging of the lithium secondary batteries according to Example 2-1 and Comparative Examples 2-1 and 3 at room temperature (25° C.).

Specifically, for the lithium secondary batteries according to Example 2-1 and 2-2, Example 3, Comparative Examples 2-1 to 2-5, and Comparative Example 3, each voltage drop according to a change in capacity upon charging and discharging under a condition listed in Table 4 below within an operating voltage of 2.8 to 4.3 V at room temperature (25° C.) and a change in capacity upon charging and discharging under a condition of 1 C/1 C within an operating voltage of 2.8 to 4.3 V at room temperature (25° C.) was measured, results of which are shown in Table 4 below and FIGS. 4 and 5.

TABLE 4

| | 0.1 C./0.1 C. | 0.2 C./0.1 C. | 0.5 C./0.1 C. | 1.0 C./0.1 C. | 2.0 C./0.1 C. |
|---|---|---|---|---|---|
| Example 2-1 | 100 | 99.6 | 97.5 | 88.1 | 40.0 |
| Example 2-2 | 100 | 99.6 | 97.5 | 87.1 | 39.1 |
| Example 3 | 100 | 99.5 | 95.5 | 89.0 | 41.0 |
| Comparative Example 2-1 | 100 | 99.5 | 97.2 | 83.3 | 34.5 |
| Comparative Example 2-2 | 100 | 80.0 | 52.0 | 15.0 | — |
| Comparative Example 2-3 | 100 | 99.0 | 92.0 | 80.0 | 30.1 |
| Comparative Example 2-4 | 100 | 73.0 | 31.2 | 8.9 | — |
| Comparative Example 2-5 | 100 | 99.4 | 97.0 | 78.8 | 38.1 |
| Comparative Example 3 | 100 | 99.6 | 97.0 | 75.8 | 29.8 |

As a result, the batteries according to Examples 2-1, 2-2 and Example 3, which included the CNTs prepared in Example 1-1 or 1-2 as a conductive material exhibited excellent rate characteristics and discharge characteristics at room temperature compared to the battery according to Comparative Example 2-1, which included the CNTs prepared by using a conventional catalyst according to Comparative Example 1-1, the batteries according to Comparative Examples 2-2 to 2-5, which included CNTs that do not satisfy physical requirements in the present invention, and the battery according to Comparative Example 3 in which CB was used alone as a conductive material.

Experimental Example 5

Figure 6:
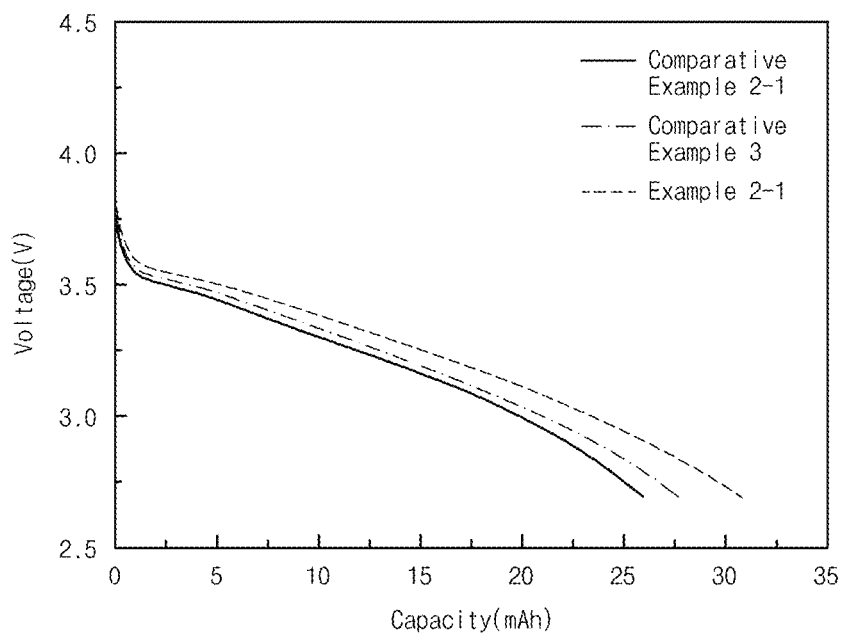
FIG. 6 is a graph illustrating observation results of output characteristics upon discharging of the lithium secondary batteries according to Example 2-1 and Comparative Examples 2-1 and 3 at low temperature (−20° C.).

For the lithium secondary batteries according to Example 2-1, Comparative Example 2-1, and Comparative Example 3, discharge characteristics upon charging and discharging under a condition of 0.2 C within an operating voltage of 2.7 to 3.8 V at low temperature (−20° C.) were evaluated, results of which are shown in Table 5 below and FIG. 6.

TABLE 5

|  | Example 2-1 | Comparative Example 2-1 | Comparative Example 3 |
|---|---|---|---|
| Discharging time (sec) | 30.64 | 25.88 | 27.61 |
| Increase rate of discharging time compared to Comparative Example 2-1 (%) | 118 | 100 | 107 |

As a result, the battery according to Example 2-1, which included the CNTs according to Example 1-1 as a conductive material, exhibited improved discharge characteristics at low temperature compared to Comparative Example 2-1 and Comparative Example 3.

The invention claimed is:

1. A conductive material for a secondary battery comprising: carbon nanotubes having a spherical secondary structure in which carbon nanotube units having a diameter of 20 to 150 nm, are entangled, have a bulk density of 30 to 70 kg/m$^3$, exhibiting a ratio (TD/BD) of a true density (TD) and a bulk density (BD) of 30 to 120, and containing a metal in an amount greater than 0 ppm and 50 ppm or less.

2. The conductive material of claim 1, wherein the carbon nanotubes have a true density of 2,100 to 2,500 kg/m$^3$.

3. The conductive material of claim 1, wherein the carbon nanotubes have a BET specific surface area of 30 to 120 m$^2$/g.

4. The conductive material of claim 1, wherein the carbon nanotubes have an average particle size (D$_{50}$) of 200 to 800 µm.

5. The conductive material of claim 1, wherein the carbon nanotubes comprise at least one of the elements selected from the group consisting of Fe, Co, Mo, V and Cr, in an amount greater than 0 ppm and 5 ppm or less.

6. The conductive material of claim 1, wherein the carbon nanotubes comprise a secondary structure have a packing volume resistivity of 0.01 to 0.02 ohm·cm at a packing density of 0.9 to 1.5 g/cc.

7. The conductive material of claim 1, further comprising 50 to 200 parts by weight of a particulate carbon-based material with respect to 100 parts by weight of the carbon nanotubes.

8. The conductive material of claim 7, wherein the particulate carbon-based material is carbon black.

9. The conductive material of claim, 1 wherein the ratio (TD/BD) of a true density (TD) and a bulk density (BD) is 30 to 83.

10. A method of preparing the conductive material for a secondary battery according to claim 1, comprising:
preparing the carbon nanotubes by bringing a supported catalyst in which a metal catalyst is supported in an α-alumina support in contact with a carbon source at equal to or greater than 650° C. and less than 800° C.; and
removing metal impurities in the carbon nanotubes through chlorination.

11. The method of claim 10, wherein the removal of metal impurities in the carbon nanotubes is performed by a process in which the carbon nanotubes are brought in contact with a chlorine source under a nitrogen or vacuum atmosphere at 450 to 900° C. to chlorinate a metal in the carbon nanotubes, and then the chlorinated metal is evaporated through heating to 800 to 1,500° C.

12. An electrode for a secondary battery comprising the conductive material according to claim 1.

13. The electrode of claim 12, wherein the electrode is a positive electrode.

14. A lithium secondary battery comprising the electrode according to claim 12.

* * * * *